(12) United States Patent  
Bates et al.

(10) Patent No.: US 7,730,260 B2  
(45) Date of Patent: Jun. 1, 2010

(54) DELETE RECYCLING OF HOLOGRAPHIC DATA STORAGE

(75) Inventors: Allen Keith Bates, Tucson, AZ (US); Nils Haustein, Soergenloch (DE); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 11/738,200

(22) Filed: Apr. 20, 2007

(65) Prior Publication Data

US 2008/0259418 A1   Oct. 23, 2008

(51) Int. Cl.
   G06F 12/02   (2006.01)
   G03H 1/00   (2006.01)

(52) U.S. Cl. .................. 711/117; 711/165; 365/125; 365/216; 365/235; 359/1

(58) Field of Classification Search .............. None
   See application file for complete search history.

(56) References Cited

U.S. PATENT DOCUMENTS

| 5,675,780 | A | * | 10/1997 | Plant-Mason et al. | 707/6 |
|---|---|---|---|---|---|
| 5,781,773 | A | * | 7/1998 | Vanderpool et al. | 707/100 |
| 5,907,581 | A | * | 5/1999 | Ashley et al. | 375/242 |
| 6,041,334 | A | * | 3/2000 | Cannon | 707/204 |
| 6,052,346 | A |   | 4/2000 | Arataki et al. | 369/47 |
| 6,868,177 | B1 | * | 3/2005 | Camahort et al. | 382/154 |
| 7,024,427 | B2 | * | 4/2006 | Bobbitt et al. | 707/200 |
| 7,136,884 | B2 |   | 11/2006 | Mitsuda et al. | 707/205 |
| 2005/0097142 | A1 | * | 5/2005 | Best et al. | 707/200 |
| 2006/0221420 | A1 | * | 10/2006 | Itakura et al. | 359/22 |
| 2006/0227398 | A1 |   | 10/2006 | Lawrence et al. | 359/15 |
| 2006/0233088 | A1 |   | 10/2006 | McNiece | 369/103 |
| 2008/0056042 | A1 | * | 3/2008 | Leonhardt | 365/216 |

* cited by examiner

*Primary Examiner*—Jack A Lane  
(74) *Attorney, Agent, or Firm*—John H. Holcombe

(57) ABSTRACT

Data hologram recycling systems, methods and computer program products are configured to arrange data for storage in the intermediate data storage as data segments which are replicas of holographic storage segments for destaging to the holographic data storage, and to determine retrieval for recycling of the destaged holographic storage segments to which aggregated requests for deletion are directed. The retrieval determination may be based on a plurality of policies.

16 Claims, 2 Drawing Sheets

DELETE RECYCLING OF HOLOGRAPHIC DATA STORAGE

DOCUMENT INCORPORATED BY REFERENCE

Commonly assigned U.S. Patent Application Serial No. (TUC920070009US1) is incorporated for its showing of a system for aggregating data into data segments that are replicas of holographic storage segments, storing the data segments in intermediate storage and destaging the data segments to holographic data storage.

FIELD OF THE INVENTION

This invention relates to holographic data storage, and, more particularly, to arranging data for storage by holographic data storage.

BACKGROUND OF THE INVENTION

Holographic storage comprises a high density data storage capability. Typically, data is recorded into a holographic medium by employing a data beam that is two-dimensional in nature and comprises a rectangular image of a large number of bits arranged in a raster pattern. The data beam and a reference beam are separately directed to the holographic medium and intersect and interfere to form an interference wave front that is recorded as a holographic image known as a hologram into the holographic medium. Additional holograms may be recorded along linear tracks and at various depths of the holographic medium to provide a high capacity data storage.

Commonly assigned U.S. Patent Application Serial No. (TUC920070009US1) shows a system for aggregating data into data segments that are replicas of holographic storage segments, storing the data segments in intermediate storage and destaging the data segments to holographic data storage.

SUMMARY OF THE INVENTION

Data hologram recycling systems, methods and computer program products aggregate requests for deletion of data elements of holographic storage segments stored by the holographic data storage, for example, as holograms, and recycles the holographic storage segments.

In one embodiment, a recycling system comprises intermediate data storage configured to store data, and storage control configured to arrange data for storage in the intermediate data storage as data segments which are replicas of holographic storage segments for destaging to the holographic data storage, and to determine retrieval for recycling of the destaged holographic storage segments to which aggregated requests for deletion are directed. The retrieval determination may be based on a plurality of policies.

In a further embodiment, the storage control is configured to determine whether the remaining available capacity of the holographic data storage falls below a threshold, and, if so, to retrieve at least one destaged holographic storage segment for recycling.

In a still further embodiment, the storage control is configured to determine whether the activity level of the storage control is below a threshold, and, if so, to retrieve at least one destaged holographic storage segment for recycling.

In another embodiment, the storage control is configured to determine whether the intermediate data storage has insufficient room for the destaged holographic storage segment(s), and, if so, to prevent the retrieval.

In a further embodiment, the storage control is additionally configured to respond to a retrieval of destaged holographic storage segment(s) to the intermediate data storage, to determine whether the retrieved storage segment comprises data for which requests for deletion of data have been aggregated, and, if so, to re-open the retrieved storage segment for deletion of the data.

In a still further embodiment, the storage control is additionally configured to respond to re-opening a plurality of previously destaged holographic storage segments of the intermediate data storage, to delete data of the re-opened storage segments for which requests for deletion of data have been aggregated, and to combine remaining data of the re-opened segments while eliminating at least some previously existing padding of the re-opened storage segments, thereby reducing the number of the re-opened retrieved storage segments.

In another embodiment, a recycling system comprises apparatus to aggregate requests for deletion of data elements of the holographic storage segments stored by the holographic data storage; intermediate data storage configured to store data, and storage control configured to arrange data for storage in the intermediate data storage as data segments which are replicas of holographic storage segments for destaging to the holographic data storage; and to determine retrieval for recycling of the destaged holographic storage segments to which the aggregated requests for deletion are directed.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
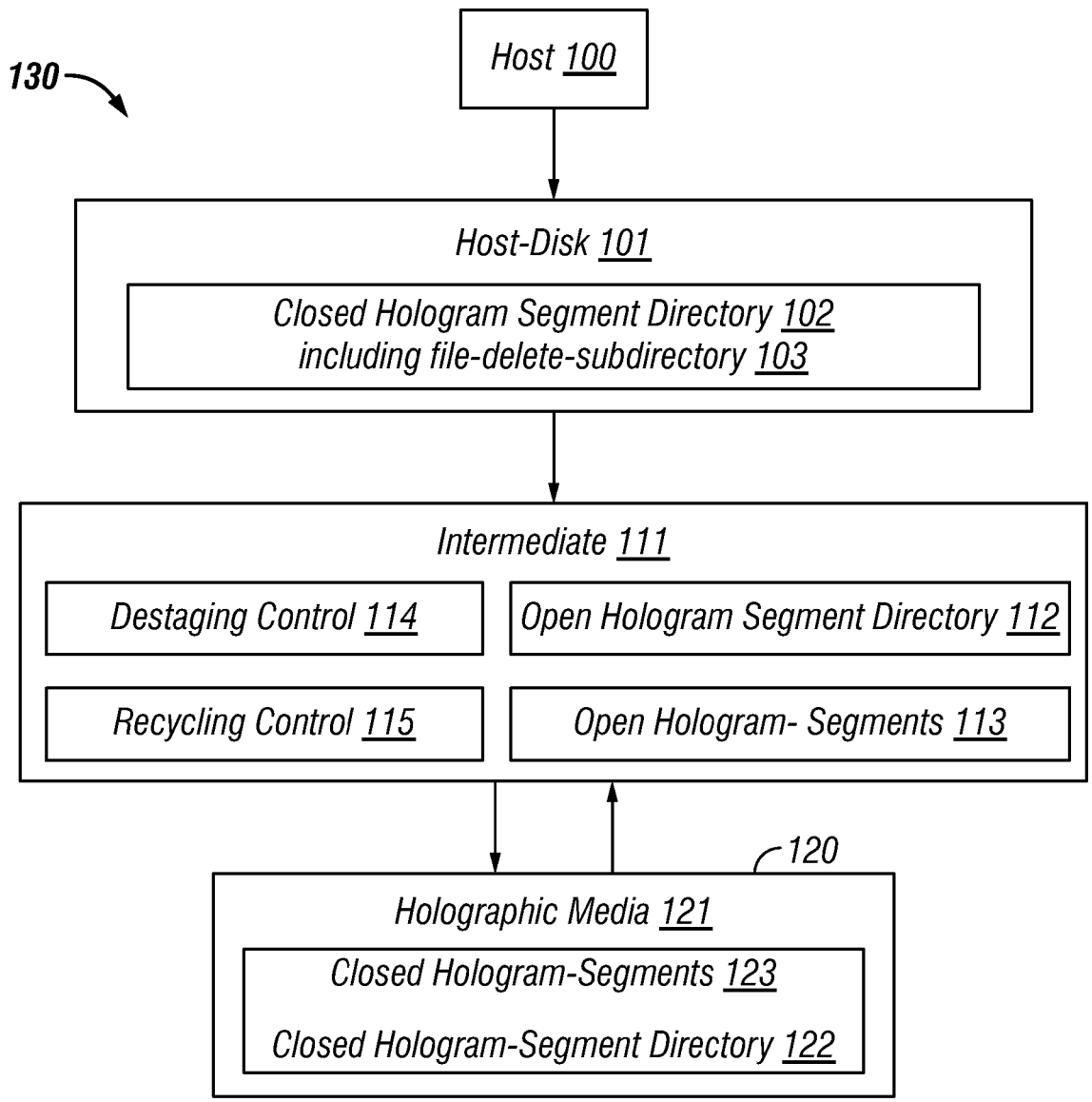
FIG. 1 is a block diagram illustrating an embodiment of a recycling system for recycling holographic storage segments of holographic data storage.

Referring to FIG. 1, an embodiment of a recycling system 130 is illustrated that provides efficiency in deleting small files storing as holographic images 123 in a holographic media 121 of a holographic data storage 120.

Files of data to be stored originate with host disk storage 101 of a host system 100. In accordance with the incorporated (TUC920070009US1) application, data for storage by the holographic data storage 120 arranged in an intermediate data storage 111 as data segments 113 which are replicas of holographic storage segments, meaning that the data segments 113 are essentially an area of volatile memory, non volatile memory, or disk, the same capacity or storage size as a hologram 123 stored on the holographic media 121, or the same capacity or storage size as an integral number of hologram segments stored on the holographic media. Files of data are aggregated into the data segments 113, which are called "open" segments. A destaging control 114 determines the destaging of the data segments to the holographic data storage in accordance with a plurality of policies, such as whether a segment is full, a time threshold has been reached, or whether a threshold number of segments are "open". When the data segments are destaged to holographic media 121, they become "closed" segments 123. The destaging control 114 may also conduct the aggregation of the files of data into the data segments 113.

An "Open Hologram-Segment Directory" 112 is maintained in the intermediate data storage 111 for each open hologram segment 113. This records which files are stored wherein the open segment 113. When the open segment 113 is closed, the hologram-segment directory 112 is replicated and embedded within the closed Hologram-Segment on the intermediate data storage 111, for storage on the holographic media 121 as directory 122.

The intermediate data storage 111 writes the closed segment out to the holographic media 121 as a single hologram or single-group of holograms, generates or adds information to a closed hologram-segment directory 122 and transfers the newly closed hologram directory to the host 100 where it is used to update an overall hologram-directory 102, which may be stored on the host disk 101. At this point, the intermediate data storage 111 ceases to retain any information about the hologram-segment that has just been closed.

Over time, some of the files may be deleted by the user, due to age, lack of need, or obsolescence. The requests for deletion are tracked at the host level and are aggregated at a file-delete-subdirectory 103 by the host system 100. Based on a plurality of policies, a recycling control 115 determines retrieval for recycling of the destaged holographic storage segments to which aggregated requests for deletion are directed.

The invention can take the form of an entirely hardware embodiment, an entirely software embodiment or an embodiment containing both hardware and software elements. In a preferred embodiment, the invention is implemented in software, which includes but is not limited to resident software, microcode, firmware, etc.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, and random access memory (RAM), a read-only memory (ROM), a rigid magnetic disk and an optical disk. Current examples of optical disks include compact disk—read only memory (CD-ROM), compact disk—read/write (CD-R/W), DVD, HD-DVD and Blu-Ray.

A data processing system, such as intermediate storage 111, suitable for storing and/or executing program code, will include at least one processor, such as destaging control 114 and recycling control 115, coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the intermediate data storage 111 either directly or through intervening I/O controllers. Connections to and within the intermediate data storage 111 may encompass connection links including intervening private or public networks. The communication links may comprise serial interconnections, such as RS-232 or RS-422, Ethernet connections, SCSI interconnections, ESCON interconnections, FICON interconnections, a Local Area Network (LAN), a private Wide Area Network (WAN), a public wide area network, Storage Area Network (SAN), Transmission Control Protocol/Internet Protocol (TCP/IP), the Internet, and combinations thereof.

Although the policies could be executed at the host 100 level, a preferred embodiment is that the policies are executed with respect to the intermediate data storage 111 level, so that the host is not burdened by the process, and so that the holographic storage 120 can be cost-reduced by not requiring this intelligence.

Figure 2:
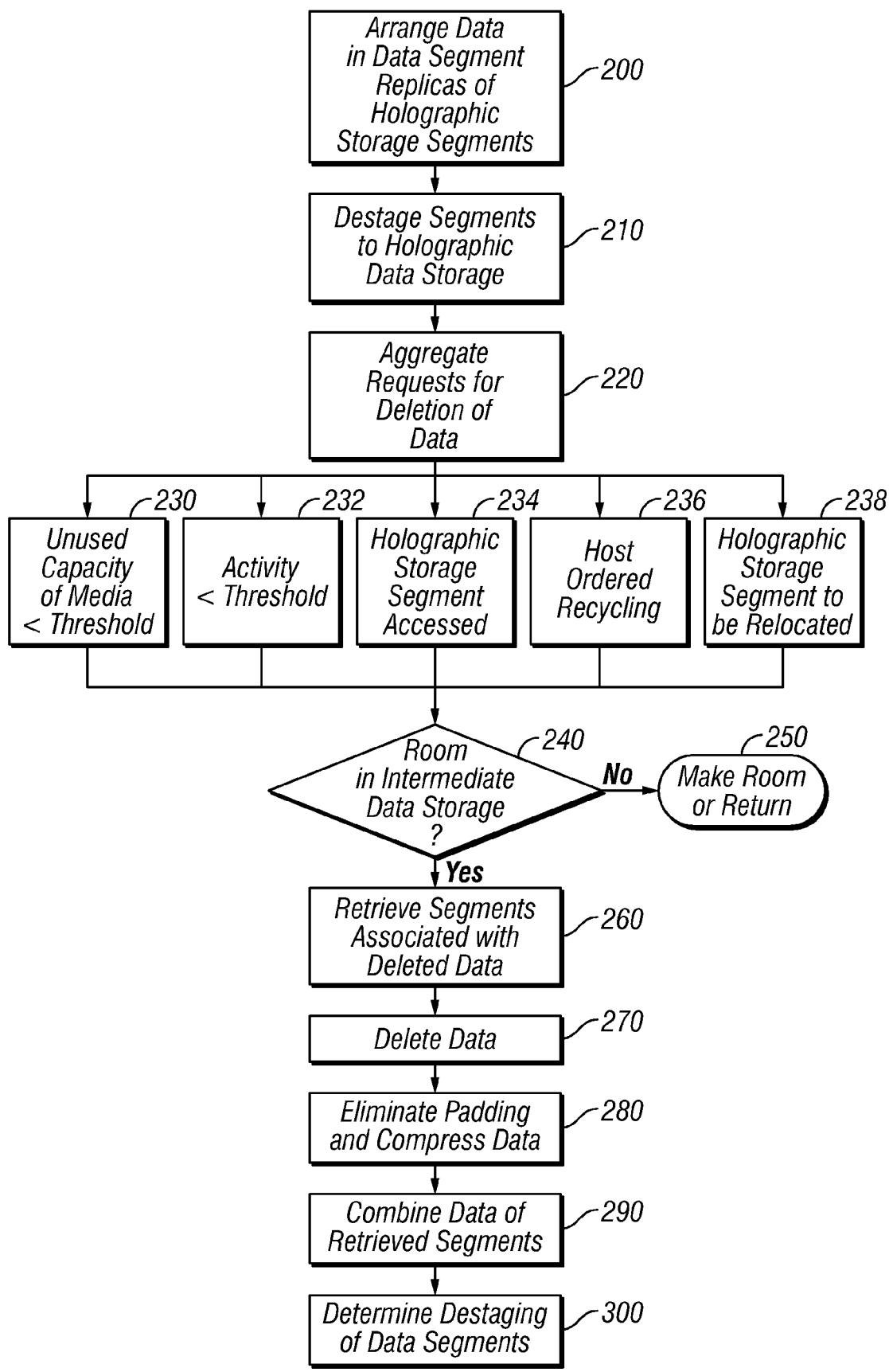
FIG. 2 is a flow chart depicting an embodiment of recycling holographic storage segments of holographic data storage.

Referring to FIGS. 1 and 2, in step 200, files of data to be stored in the holographic data storage 120 are arranged in intermediate data storage 111 as data segments 113 which are replicas of holographic storage segments, meaning that the data segments 113 are essentially an area of volatile memory, non volatile memory, or disk, the same capacity or storage size as a hologram 123 stored on holographic media 121, or the same capacity or storage size as an integral number of hologram segments stored on the holographic media, in accordance with the incorporated (TUC920070009US1) application. In step 210, files of data are aggregated into the data segments 113, and a destaging control 114 determines the destaging of the data segments to the holographic data storage in accordance with a plurality of policies, such as whether a segment is full, a time threshold has been reached, or whether a threshold number of segments are "open". When the data segments are destaged to holographic media 121, they become "closed" segments 123. The destaging control 114 may also conduct the aggregation of the files of data into the data segments 113.

In an embodiment of the present invention, in step 220, deletion request of files in closest hologram segments 123 are aggregated at the host 100 on the host disk 101 in the file-delete subdirectory 103 of the closed hologram segment directory 102. The aggregation of delete requests is designed to keep delete requests from raising the utilization of system 130 via clean-up accesses to the holographic media 121, and thus causing a loss of performance as real input/output requests queue up behind clean-up accesses. Although the aggregation step 220 could be executed at the recycling control 115 and intermediate data storage 111 level for the holographic data storage 120, a preferred embodiment is that the aggregation be executed with respect to the host 100 level, so that the host may aggregate deletion requests for a plurality of holographic data storage devices.

The recycling control 115 determines retrieval of the destaged holographic storage segments 123 to which aggregated requests for deletion are directed. The retrieval determination may be based on a plurality of policies, each of which may be active at all times or activated at selected times by the recycling control or host system.

Step 230 represents a recycling policy based on the remaining available storage capacity of the holographic media 121. When the remaining available capacity falls below a user-selectable threshold, a "forced recycling" foreground mode is entered and previously closed segments 123 stored by the holographic media which have delete-requested files as marked in file-delete subdirectory 103 are ordered to be retrieved.

In step 240, the recycling control 115 determines whether there is sufficient room in the intermediate data storage 111, for example of the open hologram segments, to handle the expected retrieved and re-opened segments. Since step 230 represents a required recycling, if step 240 indicates there is insufficient room, step 250 will stop receiving new data of step 200, and combine existing open segments to make room for the expected retrieved and re-opened segments, and/or swap the retrieved segments for currently open segments. Some or all of the previously closed segments 123 are retrieved in step 260 as determined by the recycling control 115, as will be discussed. Ultimately, the deleted-requested files are removed from the re-opened segments, or other processes are used to generate space, as will be explained. If currently open segments are swapped to the media to make room in the intermediate data storage, as the retrieved and re-opened segments are reduced in number, the originally swapped segments now stored in the holographic media will be returned to the intermediate data storage for destaging.

Step 232 represents a recycling policy covering the situation where the utilization of system 130 is low and below a user-defined threshold, such as when "idle" time reaches a threshold. In step 240, the recycling control 115 determines whether there is sufficient room in the intermediate data storage 111, for example of the open hologram segments, to handle the expected retrieved and re-opened segments. The recycling policy of step 232 is not a "forced recycling" and if step 240 indicates that the intermediate data storage does not have sufficient room, step 250 returns to the data destaging process.

If there is sufficient room, in step 260, then some or all of the previously closed segments 123 are retrieved as determined by the recycling control 115.

Step 234 represents an opportunity recycling policy when data access retrievals are done for data in previously closed holographic segments 123, for example to read the data, if those segments contain files earmarked for deletion in subdirectory 103. If step 240 indicates that there is sufficient room in the intermediate data storage 111 to handle the expected retrieved and re-opened segments, then some or all of the previously closed segments 123 are retrieved as determined by the recycling control 115. Any deletion will await the completion of a pending read request from the host.

Host ordered recycling may be conducted in step 236. The policy of step 236 allows a host system to make room in the holographic media 121, for example to reserve the media for expected future use.

The recycling policy of step 238 represents situations when a previously closed holographic segment 123 is to be relocated on the holographic media 121, for example because of an error condition at its current location. If in step 240, there is sufficient room in the intermediate data storage, the holographic segment is reopened in step 260 before that segment is relocated on the holographic media 121.

Once a holographic segment 123 has been retrieved, the segment is converted to an "open" segment 113 in step 270 and the deletion request is accomplished, for example, by deleting the entry in an open hologram segment directory 112 while the segment are being organized. Optional step 280 may compress uncompressed data of the data segment 113 and may eliminate some or all of any padding that had been used to fill out the segment. The result of the deletion step 270 and the use of step 280 should be that there is now increased space in the data segment. In step 290, data from various data segments, and/or new data to be stored, are combined into the retrieved segments, either leaving fewer data segments for storing in the holographic media, or storing new data without having to generate new holographic segments 123. The directory 112 is updated with the new information, and, in step 300, the data segments are destaged to the holographic media 121 as holographic segments 123. The arrangement of the data and the destaging of the segments may be accomplished by the intermediate data storage 111, for example by the destaging control 114 as discussed in the incorporated (TUC920070009US1) application. The intermediate data storage 111 writes the closed segment out to the holographic media 121 as a single hologram or single-group of holograms, generates or adds information to a closed hologram-segment directory 122 and transfers or replicates the newly closed hologram directory to the host 100 where it is used to update the overall hologram-directory 102, which may be stored on the host disk 101. At this point, the intermediate data storage 111 ceases to retain any information about the hologram-segment that has just been closed.

Those of skill in the art will understand that changes may be made with respect to the methods discussed above, including changes to the ordering of the steps. Further, those of skill in the art will understand that differing specific component arrangements may be employed than those illustrated herein. For example, the destaging control 114 and the recycling control 115 may comprise a single control, or may comprise wholly or partially separate entities.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A recycling system configured to recycle data of holographic data storage, comprising:
   intermediate data storage configured to store data;
   storage control configured to arrange data for storage in said intermediate data storage as data segments which are replicas of holographic storage segments for destaging to said holographic data storage; and to determine retrieval for recycling of said destaged holographic storage segments, to which aggregated requests for deletion are directed, said determination based on a plurality of policies wherein said storage control is additionally configured to respond to a retrieval of at least one destaged holographic storage segment to said intermediate data storage, to determine whether said retrieved storage segment comprises data for which request for deletion of data have been aggregated, and if so, to re-open said retrieved storage segment for deletion of said data.

2. The recycling system of claim 1, wherein said storage control is configured to determine whether the remaining available capacity of said holographic data storage falls below a threshold, and, if so, to retrieve at least one said destaged holographic storage segment for recycling.

3. The recycling system of claim 1, wherein said storage control is configured to determine whether the activity level of said storage control is below a threshold, and, if so, to retrieve at least one said destaged holographic storage segment for recycling.

4. The recycling system of claim 3, wherein said storage control is configured to determine whether said intermediate data storage has insufficient room for said at least one said destaged holographic storage segment, and, if so, to prevent said retrieval.

5. The recycling system of claim 1, wherein said storage control is additionally configured to respond to re-opening a plurality of previously destaged holographic storage segments of said intermediate data storage, to delete data of said re-opened storage segments for which requests for deletion of data have been aggregated, and to combine remaining data of said re-opened segments while eliminating at least some previously existing padding of said re-opened storage segments, thereby reducing the number of said re-opened retrieved storage segments.

6. A method for recycle data of holographic data storage comprising the steps of:
arranging data for storage in intermediate data storage as data segments which are replicas of holographic storage segments for destaging to said holographic data storage; and
determining retrieval for recycling of said destaged holographic storage segments to which aggregated requests for deletion are directed, said determination based on a plurality of policies additionally comprising the step of responding to a retrieval of at least one destaged holographic storage segment to said intermediate data storage, determining whether said retrieved storage segment comprises data for which request for deletion of data have been aggregated, and if so, to re-open said retrieved storage segment for deletion of said data.

7. The method of claim 6, wherein said determining step comprises determining whether the remaining available capacity of said holographic data storage falls below a threshold, and, if so, to retrieve at least one said destaged holographic storage segment for recycling.

8. The method of claim 6, wherein said determining step comprises determining whether the activity level of said storage control is below a threshold, and, if so, to retrieve at least one said destaged holographic storage segment for recycling.

9. The method of claim 8, wherein said determining step additionally comprises determining whether said intermediate data storage has insufficient room for said at least one said destaged holographic storage segment, and, if so, to prevent said retrieval.

10. The method of claim 6, additionally comprising the steps of responding to re-opening a plurality of previously destaged holographic storage segments of said intermediate data storage, deleting data of said re-opened storage segments for which requests for deletion of data have been aggregated, and combining remaining data of said re-opened segments while eliminating at least some previously existing padding of said re-opened storage segments, thereby reducing the number of said reopened retrieved storage segments.

11. A computer program product comprising a computer usable storage medium embodying a computer readable program when executed on a computer causes the computer to;
arrange data for storage in intermediate data storage as data segments which are replicas of holographic storage segments for destaging to said holographic data storage;
determine retrieval for recycling of said destaged holographic storage segments to which aggregated requests for deletion are directed, said determination based on a plurality of policies wherein said computer readable program, when executed on a computer, causes the computer to additionally respond to a retrieval of at least one desteged holographic storage segment to said intermediate data storage, determine whether said retrieved storage segment comprises data for which request for deletion of data have been aggregated, and if so, to re-open said retrieved storage segment for deletion of said data.

12. The computer program product of claim 11, wherein said computer readable program, when executed on a computer, causes the computer to determine whether the remaining available capacity of said holographic data storage falls below a threshold, and, if so, to retrieve at least one said destaged holographic storage segment for recycling.

13. The computer program product of claim 11, wherein said computer readable program, when executed on a computer, causes the computer to determine whether the activity level of said storage control is below a threshold, and, if so, to retrieve at least one said destaged holographic storage segment for recycling.

14. The computer program product of claim 13, wherein said computer readable program, when executed on a computer, causes the computer to additionally determine whether said intermediate data storage has insufficient room for said at least one said destaged holographic storage segment, and, if so, to prevent said retrieval.

15. The computer program product of claim 11, wherein said computer readable program, when executed on a computer, causes the computer to additionally respond to re-opening a plurality of previously destaged holographic storage segments of said intermediate data storage, to delete data of said re-opened storage segments for which requests for deletion of data have been aggregated, and to combine remaining data of said re-opened segments while eliminating at least some previously existing padding of said re-opened storage segments, thereby reducing the number of said re-opened retrieved storage segments.

16. A recycling system configured to recycle data of holographic data storage, comprising:
apparatus to aggregate requests for deletion of data elements of said holographic storage segments stored by said holographic data storage;
intermediate data storage configured to store data;
storage control configured to arrange data for storage in said intermediate data storage as data segments which are replicas of holographic storage segments for deslaging to said holographic data storage; and to determine retrieval for recycling of said destaged holographic storage segments to which said aggregated requests for deletion are directed wherein said storage control is additionally configured to respond to a retrieval of at least one destaged holographic storage segment to said intermediate data storage, to determine whether said retrieved storage segment comprises data for which request for deletion of data have been aggregated, and if so, to re-open said retrieved storage segment for deletion of said data; to respond to re-opening a plurality of previously destaged holographic storage segments of said intermediate data storage, to delete data of said re-opened storage segments for which request for deletion of data have been aggregated, and to combine remaining data of said re-opened segments while eliminating at least some previously existing padding of said re-opened storage segment, thereby reducing the number of said re-opened retrieved storage segments.

* * * * *